(12) United States Patent
Jiang

(10) Patent No.: US 12,192,150 B2
(45) Date of Patent: Jan. 7, 2025

(54) METHOD AND DEVICE FOR INDICATION OF IN-DEVICE COEXISTENCE INTERFERENCE

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 331 days.

(21) Appl. No.: 17/620,664

(22) PCT Filed: Jun. 18, 2019

(86) PCT No.: PCT/CN2019/091759
§ 371 (c)(1),
(2) Date: Dec. 17, 2021

(87) PCT Pub. No.: WO2020/252664
PCT Pub. Date: Dec. 24, 2020

(65) Prior Publication Data
US 2022/0360416 A1    Nov. 10, 2022

(51) Int. Cl.
*H04L 5/00* (2006.01)
*H04J 11/00* (2006.01)
(Continued)

(52) U.S. Cl.
CPC ........ *H04L 5/0073* (2013.01); *H04J 11/0023* (2013.01); *H04L 5/001* (2013.01);
(Continued)

(58) Field of Classification Search
CPC ..... H04L 5/0073; H04L 5/001; H04L 5/0094; H04J 11/0023; H04W 72/0453; H04W 72/541; H04W 88/06
See application file for complete search history.

(56) References Cited

U.S. PATENT DOCUMENTS

2013/0288742 A1    10/2013    Yao et al.
2013/0315194 A1*   11/2013    Ahn ...................... H04L 5/0066
                                                                370/329
(Continued)

FOREIGN PATENT DOCUMENTS

CN    102457885 A    5/2012
CN    102595543 A    7/2012
(Continued)

OTHER PUBLICATIONS

Extended European Search report of EP Application No. 19934286.6 dated Dec. 13, 2022, (11p).
(Continued)

*Primary Examiner* — Deepa Belur
(74) *Attorney, Agent, or Firm* — Arch & Lake LLP

(57) ABSTRACT

A method for indicating in-device coexistence interference is provided. The method includes that: a terminal determines that in-device coexistence interference exists or is to occur in the terminal; and the terminal sends a carrier frequency of a carrier that causes or suffers interference, and information of a sub-band in the carrier that causes or suffers interference, to a base station, where the carrier includes at least one sub-band.

12 Claims, 11 Drawing Sheets

(51) Int. Cl.
*H04W 72/0453* (2023.01)
*H04W 72/541* (2023.01)

(52) U.S. Cl.
CPC ....... *H04L 5/0094* (2013.01); *H04W 72/0453* (2013.01); *H04W 72/541* (2023.01)

(56) References Cited

U.S. PATENT DOCUMENTS

| | | | | |
|---|---|---|---|---|
| 2014/0334330 | A1* | 11/2014 | Baghel | H04W 72/1215 370/252 |
| 2015/0358978 | A1* | 12/2015 | Lin | H04W 72/20 370/280 |
| 2016/0135213 | A1* | 5/2016 | Zhu | H04L 1/0013 370/329 |
| 2017/0181172 | A1* | 6/2017 | Susitaival | H04W 72/0453 |
| 2018/0213557 | A1* | 7/2018 | He | H04W 74/04 |
| 2018/0295637 | A1 | 10/2018 | Manolakos et al. | |
| 2021/0315026 | A1* | 10/2021 | Jung | H04W 56/001 |
| 2022/0167280 | A1* | 5/2022 | Ding | H04W 72/541 |
| 2022/0225190 | A1* | 7/2022 | Gummadi | H04W 36/0058 |
| 2024/0237107 | A1* | 7/2024 | Sedin | H04W 76/15 |

FOREIGN PATENT DOCUMENTS

| | | |
|---|---|---|
| CN | 103391180 A | 11/2013 |
| CN | 108401537 A | 8/2018 |
| GB | 2512877 A | 10/2014 |
| KR | 20130126382 A | 11/2013 |
| WO | 2013085256 A1 | 6/2013 |
| WO | 2015013924 A1 | 2/2015 |
| WO | 2019095254 A1 | 5/2019 |

OTHER PUBLICATIONS

Qualcomm Incorporated,"In-Device Coexistence for UL inter-band CA interference on GNSS receiver", 3GPP TSG-RAN WG2 Meeting #89, R2-150471, Athens, Greece, Feb. 9-13, 2015,(8p).
Nec, "Left (Right) most interfered PRB index as UE assistance information for LTE IDC", 3GPP TSG-RAN WG2 Meeting #79, R2-123687, Qingdao, China, Aug. 13-17, 2012, (3p).
Extended European Search Report issued in Application No. 19934286.6, dated Dec. 13, 2022,(11p).
International Search Report of PCT/CN2019/091759 dated Feb. 21, 2020 with English translation, (4p).
Samsung, "Correction concerning IDC reporting", 3GPP TSG-RAN2 Meeting #104, Spokane, WA, R2-1819174, Nov. 30, 2018, (8p).
1 The first CNOA issued in Application No. 201980001108.3, dated Sep. 2, 2022, with English translation (14p).
IN Examination Report of Application No. 202227002075 dated on Jun. 8, 2022 with English translation, (6p).
Chinese Patent Office, Office Action issue in Application No. 201980001108.3 dated on Jul. 28, 2023.(5p).

* cited by examiner

METHOD AND DEVICE FOR INDICATION OF IN-DEVICE COEXISTENCE INTERFERENCE

CROSS-REFERENCE TO RELATED APPLICATION

This application is the U.S. national phase application of International Application No. PCT/CN2019/091759, filed on Jun. 18, 2019, the entire contents of which are incorporated herein by reference for all purposes.

TECHNICAL FIELD

The present disclosure relates to the field of communication technology, in particular, to a method for indicating in-device coexistence interference, a device for indicating in-device coexistence interference, an electronic device, and a computer-readable storage medium.

BACKGROUND

Current electronic devices can communicate based on multiple networks, and signals from different networks may cause interference, causing the electronic devices to fail to communicate normally.

For this situation, related technologies have introduced in-device coexistence (IDC) interference solutions. Specifically, when in-device coexistence interference occurs in an electronic device and the electronic device itself cannot solve the in-device coexistence interference, it reports the carrier frequency of the carrier that causes or suffers interference to a base station.

However, in related technologies, only the carrier frequency is reported to the base station, which is only applicable to the situation where the carrier bandwidth that causes or suffers interference is small. For the carrier with a large bandwidth supported by 5G NR (New Radio), only based on a frequency point, the base station is difficult to accurately determine the specific frequency band in the carrier that causes or suffers interference.

SUMMARY

According to the first aspect of the present disclosure, a method for indicating in-device coexistence interference is provided, performed by a terminal, and the method includes: determining that in-device coexistence interference exists or is to occur in the terminal; and sending a carrier frequency of a carrier that causes or suffers interference, and information of a sub-band in the carrier that causes or suffers interference, to a base station, wherein the carrier includes at least one sub-band.

According to a second aspect of the present disclosure, a device for indicating in-device coexistence interface is provided. The device includes a processor and a memory for storing processor-executable instructions.

Further, the processor is configured to: determine that in-device coexistence interference exists or is to occur in a terminal; and send a carrier frequency of a carrier that causes or suffers interference, and information of a sub-band in the carrier that causes or suffers interference, to a base station, where the carrier includes at least one sub-band.

According to a third aspect of the present disclosure, a computer-readable storage medium is provided, with a computer program stored thereon. When the computer program is executed by a processor, steps in the method according to the first aspect are performed.

BRIEF DESCRIPTION OF THE DRAWINGS

In order to more clearly describe the technical solutions in the embodiments of the present disclosure, the following will briefly introduce the accompanying drawings used in the description of the embodiments. Obviously, the accompanying drawings in the following description are only some embodiments of the present disclosure. For those of ordinary skill in the art, other drawings can be obtained based on these drawings without creative labor.

DETAILED DESCRIPTION

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In view of the above, the embodiments of the present disclosure provide a method for indicating in-device coexistence interference, a device for indicating in-device coexistence interference, an electronic device, and a computer-readable storage medium, to solve the problem that the base station is difficult to accurately determine the specific frequency band in the carrier that causes or suffers interference, only according to the frequency point in the related art.

Figure 1:
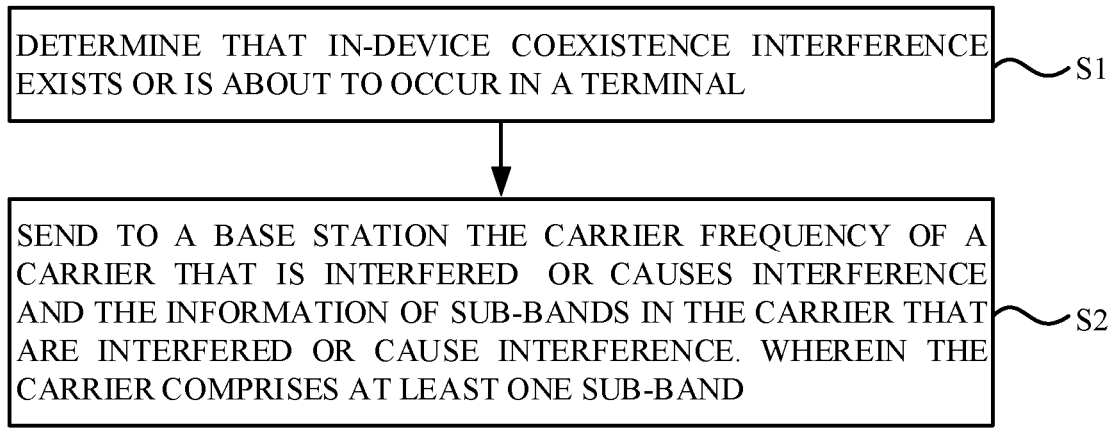
FIG. 1 is a schematic flowchart showing a method for indicating in-device coexistence interference according to an embodiment of the present disclosure.

FIG. 1 is a schematic flowchart showing a method for indicating in-device coexistence interference according to an embodiment of the present disclosure. The method for indicating in-device coexistence interference shown in the embodiment can be applied to terminals such as mobile phones, tablet computers, and wearable devices, etc., and the terminal can be used as user equipment to communicate with a base station, wherein it can communicate with the base station based on 5G NR.

As shown in FIG. 1, the method for indicating in-device coexistence interference may include the following steps:

In step S1, it is determined that in-device coexistence interference exists or is to occur in a terminal;

In one embodiment, the terminal can use a network of a service provider, such as 5G network communication, and can use networks in other frequency bands, such as Wi-Fi, Bluetooth, GNSS (Global Navigation Satellite System) and other network communications as well. Networks such as Wi-Fi, Bluetooth, GNSS belong to the ISM (Industrial Scientific Medical) frequency band.

In the case that mutual interference exists between the 5G network and the network under the ISM frequency band, it can be determined that the terminal has in-device coexistence interference, and in the case that mutual interference is to occur between the 5G network and the network under the ISM frequency band, it can be determined that the terminal is to have in-device coexistence interference. For example, a time period can be set in advance, called a preset time period, and then it is determined whether the terminal has in-device coexistence interference in the preset time period after the current moment. If the terminal has in-device coexistence interference in the preset time period after the current moment, it is determined that the terminal is to have in-device coexistence interference.

In step S2, a carrier frequency of a carrier (the carrier frequency may refer to a frequency of a center frequency point of the carrier) that causes or suffers interference, and information of a sub-band in the carrier that causes or suffers interference, to a base station, wherein the carrier contains or includes at least one sub-band.

The in-device coexistence interference to occur, may mean that the terminal has the in-device coexistence interference in the preset time period after the current moment. The preset time period can be configured by the base station or set by the terminal itself. If the in-device coexistence interference is the in-device coexistence interference to occur, the terminal can further send the time when the in-device coexistence interference occurs in the future, to the base station, so that the base station can solve the in-device coexistence interference in time, for example, it can solve it directly at the time, or can solved it when the time arrives.

It should be noted that, when the terminal has or is to have in-device coexistence interference, the terminal can first determine whether the in-device coexistence interference existing or to occur can be solved by itself, and only when it is judged that it cannot be solved by itself, it sends the information of the sub-band of the carrier frequency, to the base station.

In related technologies, because the terminal uses 4G LTE (Long Term Evolution) network communication, a bandwidth of the carrier in the 4G network is relatively small, generally about 20 MHz, and in general, the granularity of the interference from the network under the ISM frequency band that the carrier in the 4G network suffers, or to the network under the ISM frequency band that the carrier in the 4G network causes, is about 20 MHz as well. That is to say, for the carrier that causes or suffers interference, its entire bandwidth causes or suffers interference, so the terminal only needs to report the frequency point to the base station, and then the base station can determine that the entire carrier corresponding to the frequency point causes or suffers interference.

However, in the case that the terminal is based on 5G network communication, because a bandwidth of the carrier in the 5G network can reach 100 MHz (for example, the FR1 frequency band) or even 400 MHz (for example, the FR2 frequency band), the granularity of the interference from the network under the ISM frequency band that the carrier in the 5G network suffers, or to the network under the ISM frequency band that the carrier in the 5G network causes, is not limited to 20 MHz, so only reporting the frequency point to the base station cannot make the base station to determine which frequency band in the carrier causes or suffers interference.

According to the embodiments of the present disclosure, in the case that the terminal has or is to have in-device coexistence interference, it can send the carrier frequency of the carrier that causes or suffers interference, to the base station, so that the base station can determine the carrier that causes or suffers interference according to the carrier frequency. In addition, it can send information of sub-band in the carrier that causes or suffers interference, to the base station, so that the base station can determine the specific sub-band in the carrier that causes or suffers interference according to the information of the sub-band. Therefore, when the terminal is based on network communication with a larger bandwidth and has or is to have in-device coexistence interference, the base station can accurately determine which sub-band in the carrier used for terminal communication causes or suffers interference according to the carrier frequency and the information of the sub-band reported by the terminal, so that the base station can accurately determine how to resolve the in-device coexistence interference that exists or is to occur in the terminal.

For example, a carrier A with a carrier frequency of X in the 5G network used by the terminal suffers interference from a network under the ISM frequency band, a bandwidth of the carrier A is 100 MHz, the carrier A contains 5 sub-bands, and each of the sub-bands has a bandwidth of 20 MHz (the bandwidths of the respective sub-bands can be unequal as well, which can be set as needed). Specifically, if the second frequency band of the 5 sub-bands suffers interference, the terminal can send the carrier frequency X of the carrier A and identification information of the second sub-band to the base station, such that the base station can determine that the carrier A in the 5G network used by the terminal suffers interference according to the carrier frequency X, and can accurately determine that the second sub-band of the carrier A suffers interference according to the identification information of the second sub-band, so as to accurately determine the specific frequency band in the carrier that suffers interference, so that the base station can accurately determine how to solve the in-device coexistence interference that exists or is to occur in the terminal.

It should be noted that, in the 5G network used by the terminal, one or more carriers may suffer interference from the network under the ISM frequency band, or cause interference to the network under the ISM frequency band, so the carrier frequency of the carrier that causes or suffers interference sent by the terminal to the base station, may be the carrier frequency of one carrier, or the carrier frequencies of a plurality of carriers. For one carrier, there can be one or more sub-bands that cause or suffer interference, therefore, the information of the sub-band in the carrier that causes or suffers interference sent by the terminal to the base station, may be the information of one sub-band, or the information of a plurality of sub-bands.

In some examples, the information of the sub-band includes:
  a frequency offset of a frequency point of the sub-band with respect to the carrier frequency, and a bandwidth of the sub-band.

In an embodiment, the information of the sub-band reported by the terminal to the base station may include the frequency offset of the frequency point of the sub-band with respect to the carrier frequency, and the bandwidth of the sub-band. The base station can determine offset amount of the frequency point of the sub-band with respect to the carrier frequency according to the frequency offset, and then can determine a start frequency point and a cut-off frequency point of the sub-band according to the bandwidth of the sub-band.

For example, the carrier frequency is X, the frequency offset is Y, the bandwidth of the sub-band is 20 MHz, and the frequency point of the sub-band is a start frequency point of the sub-band, then the base station can determine that the sub-band is specifically from X+Y to X+Y+20 MHz.

Figure 2:
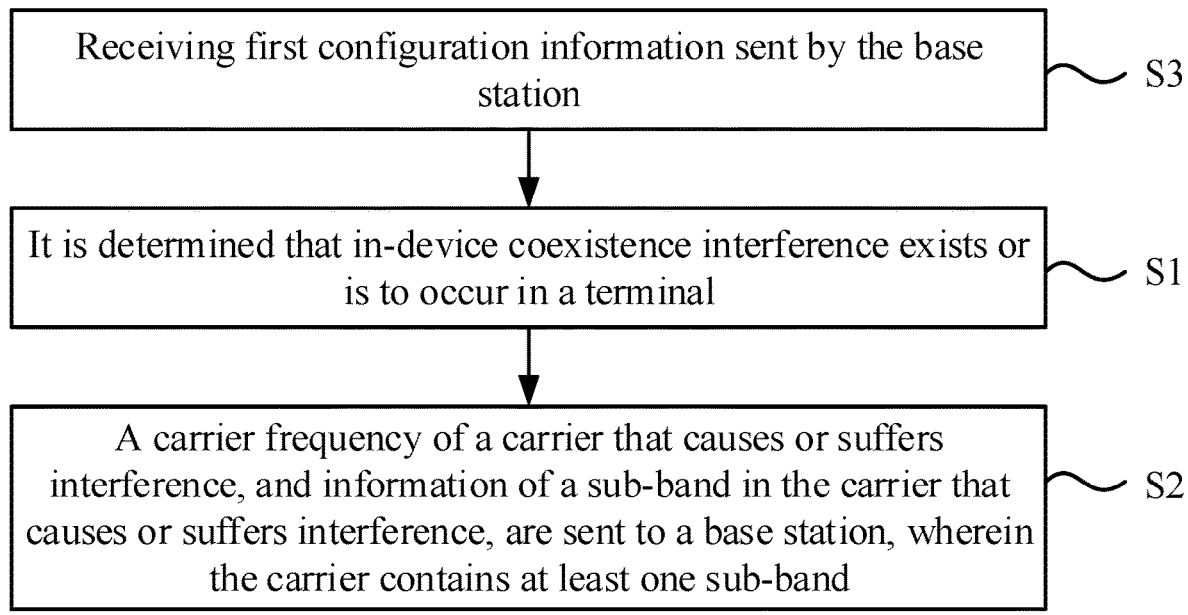
FIG. 2 is a schematic flowchart showing another method for indicating in-device coexistence interference according to an embodiment of the present disclosure.

FIG. 2 is a schematic flowchart showing another method for indicating in-device coexistence interference according to an embodiment of the present disclosure. As shown in FIG. 2, the method further includes:

In step S3, receiving first configuration information sent by the base station;
  wherein the first configuration information is configured to indicate at least one of the frequency offset, a number of the sub-bands, and the bandwidth of the sub-band, and other items are predetermined.

In an embodiment, by sending the first configuration information to the terminal, the base station may configure at least one of the frequency offset, the number of sub-bands, and the bandwidth of the sub-band, and the other items may be predetermined.

For example, the first configuration information is configured to indicate the frequency offset, and the number of sub-bands and the bandwidth of the sub-band are predetermined. For example, the first configuration information is configured to indicate the frequency offset and the number of sub-bands, and the bandwidth of the sub-band is predetermined. For example, the first configuration information is configured to indicate the frequency offset, the number of the sub-bands, and the bandwidth of the sub-band, then there is no need to predetermine the frequency offset of the sub-band, the number of the sub-bands, or the bandwidth of the sub-band.

It should be noted that an execution order of step S3 can be adjusted as required. For example, it can be executed before step S1 as shown in FIG. 2, or it can be executed between step S1 and step S2.

In some examples, the information of the sub-band includes:
  the frequency point of the sub-band, and the bandwidth of the sub-band.

In an embodiment, the information of the sub-band reported by the terminal to the base station may include the frequency point of the sub-band, and the bandwidth of the sub-band. The base station can determine which sub-band in the carrier suffers or causes interference according to the frequency point of the sub-band, and then can determine the start frequency point and the cut-off frequency point of the sub-band according to the bandwidth of the sub-band.

For example, if the carrier frequency is X, corresponding to the carrier A, the frequency point Z of the sub-band is the start frequency point of the sub-band, and the bandwidth of the sub-band is 20 MHz, then the base station can determine that the sub-band suffers or causes interference is specifically from Z to Z+20 MHz in the carrier A.

It should be noted that the frequency point of the sub-band in any of the above embodiments may be a center frequency point of the sub-band, or the start frequency point of the sub-band, which can be specifically set as required, or can be pre-appointed between the terminal and the base station. For example, the terminal and the base station pre-appoint that the frequency point uploaded by the terminal to the base station is the center frequency point of the sub-band, then the base station uses the frequency point uploaded by the terminal as the center frequency point of the sub-band to determine the sub-band.

Figure 3:
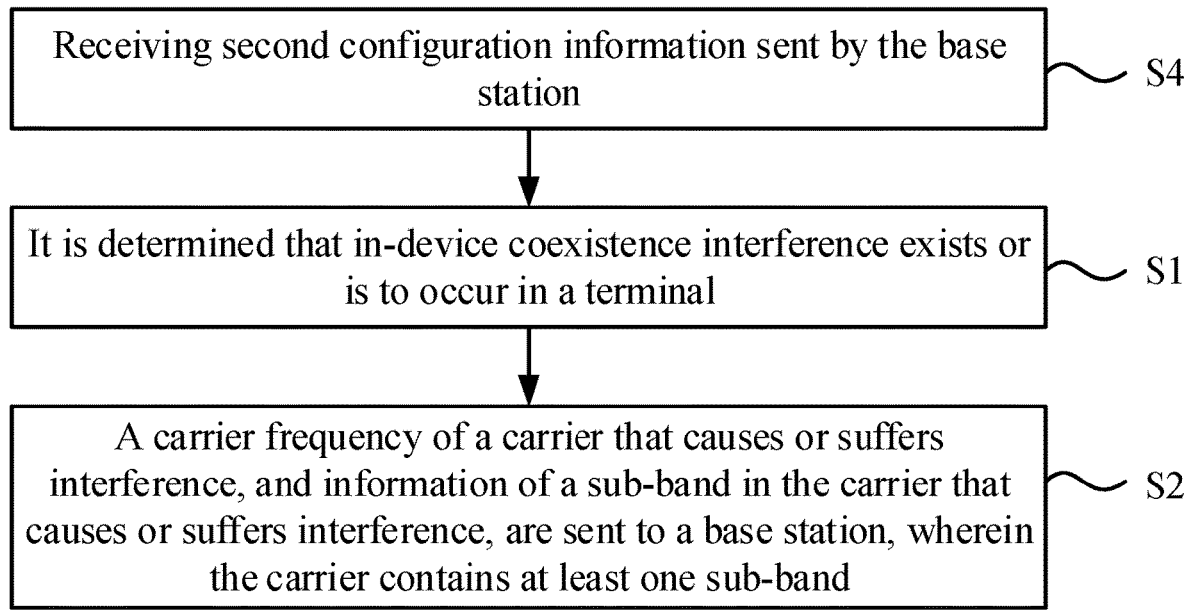
FIG. 3 is a schematic flowchart showing another method for indicating in-device coexistence interference according to an embodiment of the present disclosure.

FIG. 3 is a schematic flowchart showing another method for indicating in-device coexistence interference according to an embodiment of the present disclosure. As shown in FIG. 3, the method further includes:

In step S4, receiving second configuration information sent by the base station;
  wherein the second configuration information is configured to indicate at least one of the number of the sub-bands, and the bandwidth of the sub-band, and other items are predetermined.

In an embodiment, by sending second configuration information to the terminal, the base station may configure at least one of the number of sub-bands, and the bandwidth of the sub-band, and the other items may be predetermined.

For example, the second configuration information is configured to indicate the number of sub-bands, and the bandwidth of the sub-band is predetermined. For example, the second configuration information is configured to indicate the number of sub-bands, and the bandwidth of the sub-band, so there is no need to predetermine the number of sub-bands, or the bandwidth of the sub-band.

It should be noted that an execution order of step S4 can be adjusted as required. For example, it can be executed before step S1 as shown in FIG. 3, or it can be executed between step S1 and step S2.

In some examples, the carrier contains a plurality of sub-bands, and the information of the sub-band includes:
  identification information associated with the sub-band, wherein the identification information includes but is not limited to a sequence number of the sub-band, and a name of the sub-band.

In one embodiment, in the case that the carrier contains a plurality of sub-bands, the information of the sub-band may include the identification information associated with the sub-band, and the base station may pre-store an association relationship between the identification information and the sub-band, and then after receiving the identification information, retrieve the sub-band indicating the association of the information based on the association relationship.

For example, a carrier A with a carrier frequency of X suffers interference, a bandwidth of the carrier A is 100 MHz, the carrier A contains 5 sub-bands, and each of the sub-bands has a bandwidth of 20 MHz. Specifically, if the second frequency band of the 5 sub-bands suffers interference, the terminal can send the carrier frequency X of the carrier A, and a sequence number of the second sub-band, for example being 2, to the base station, so that the base station can determine according to the carrier frequency X that the carrier A in the 5G network used by the terminal suffers interference, and can accurately determine according to the sequence number 2 that specifically the second sub-band in the carrier A suffers interference, so that the specific frequency band in the carrier that suffers interference can be accurately determined, so that the base station can accurately determine how to solve the in-device coexistence interference that exists or is to occur in the terminal.

In some examples, the sub-band is a bandwidth part (BWP for short).

In one embodiment, the carrier in the 5G network used by the terminal can be pre-configured as a plurality of bandwidth parts, that is, the carrier contains a plurality of bandwidth parts, then, in the case that the terminal has or is to have in-device coexistence interference, the terminal sends the information of the sub-band to the base station, specifically, may send information of the bandwidth part.

Since the bandwidth part is pre-configured by the base station, the base station already knows identification information, a start frequency point, and a cut-off frequency point of each bandwidth part in advance. Therefore, using the bandwidth part as a sub-bandwidth, if only the terminal sends the identification information of the bandwidth part to the base station, it enables the base station to accurately determine the bandwidth part corresponding to the identification information, without sending other information related to the bandwidth part, which is beneficial to reduce communication burden between the terminal and the base station.

Figure 4:
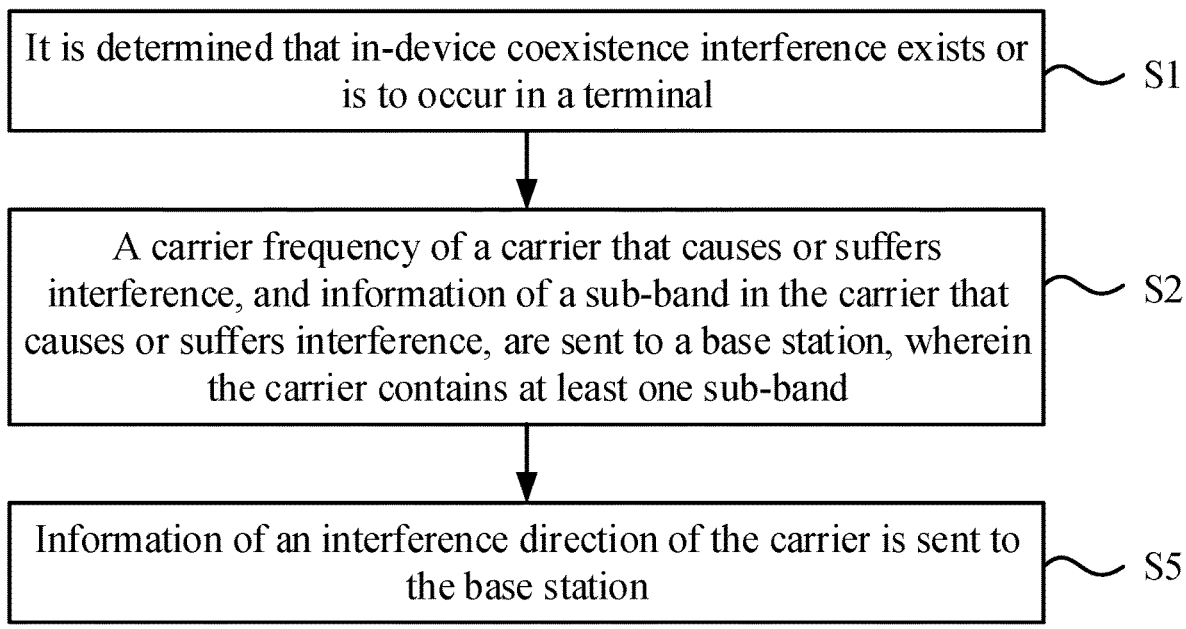
FIG. 4 is a schematic flowchart showing another method for indicating in-device coexistence interference according to an embodiment of the present disclosure.

FIG. 4 is a schematic flowchart showing another method for indicating in-device coexistence interference according to an embodiment of the present disclosure. As shown in FIG. 4, the method further includes:

In step S5, information of an interference direction of the carrier is sent to the base station.

In one embodiment, the terminal may further send the information of the interference direction of the carrier to the base station, so that the base station can determine that whether the carrier in the network of a provider (including but not limited to 5G network) used by the terminal suffers interference from a network in other frequency band, or causes interference to a network in other frequency band, so that the base station can accurately determine how to solve the in-device coexistence interference that exists or is to occur in the terminal.

For example, the carrier A in the 5G network used by the terminal suffers interference from the network under the ISM frequency band, then the information of the interference direction can be that the network under the ISM frequency band interferes with the carrier A. For example, the carrier A in the 5G network used by the terminal causes interference to the network under the ISM frequency band, then the information of the interference direction can be that the carrier A interferes with the network under the ISM frequency band.

In one embodiment, according to the information of the interference direction of the carrier, and priorities of the network of the provider used by the terminal and the network in other frequency band, the base station can determine how to solve the in-device coexistence interference that exists or is to occur in the terminal.

For example, the information of the interference direction is that the carrier in the network of the provider suffers interference from the network in other frequency band, and the priority of the network of the provider is higher, then a power of signal communicating with the terminal can be increased, so that the terminal can receive the information carried by the carrier in the network of the provider. For example, the information of the interference direction is that the carrier in the network of the provider causes interference to the network in other frequency band, and the priority of the network in the other frequency bands is higher, then communication between the carrier in the network of the provider and the terminal can be suspended, so that the terminal can receive information in the network with a higher priority first.

It should be noted that the information of the interference direction is not limited to the carrier in the network of the provider suffering interference from the network in other frequency band, or causing interference to the network in other frequency band. It can be interference between the networks of the providers, such as interference between the 4G network and the 5G network, as well.

In addition, the in-device coexistence interference is not limited to the interference between two networks, and the information of interference direction is not limited to the interference direction between two networks. For example, the in-device coexistence interference includes the interference caused by the carrier in the 4G network to the carrier in the 5G network, and the interference caused by the carrier in the 5G network to the network under the ISM frequency band, then the information of the interference direction can include two pieces, one piece indicating that the carrier in the 4G network causes interference to the carrier in the 5G network, and the other piece indicating that the carrier in the 5G network causes interference to the network under the ISM frequency band.

In some examples, the terminal communicates based on a combination of a plurality of carriers, and in response to the combination of the plurality of carriers suffering or causing interference, the information of the sub-band includes:

combination information of sub-bands in the plurality of carriers that suffer or cause interference.

In one embodiment, the terminal may communicate based on a combination of a plurality of carriers, for example, it may communicate based on carrier aggregation, MRDC (Multi-RAT Dual-Connectivity), etc.

In this case, what suffers interference from the network in other frequency band, or causes interference to the network in other frequency band, can be a combination of sub-bands in the combined plurality of carriers, and then the terminal can report the combination information of the sub-bands in the plurality of carriers that suffer or cause interference, to the base station, so that the base station can determine the combination of which specific sub-bands that suffer or cause interference.

For example, the terminal communicates based on a combination of carrier C and carrier D, carrier C contains sub-bands C1, C2, and C3, and carrier D contains sub-bands D1, D2, and D3, wherein a combination of the sub-band C1 and the sub-band D2 causes interference to the network in other frequency band, then the information of the sub-band reported to the base station includes the information of the sub-band C1 and the information of the sub-band D2, for example, the information of the sub-band may be a frequency point and a bandwidth of the sub-band C1 and a frequency point and a bandwidth of the sub-band D2, according to which, the base station can determine it is the combination of the sub-band C1 and the sub-band D2 causing interference to the network in other frequency band.

It should be noted that, when the terminal communicates based on a combination of a plurality of carriers, what suffers interference from the network in other frequency band, or causes interference to the network in other frequency band, can be a separate sub-band in the combined plurality of carriers as well. In this case, the information of the sub-band is just the information of the separate sub-band.

Figure 5:
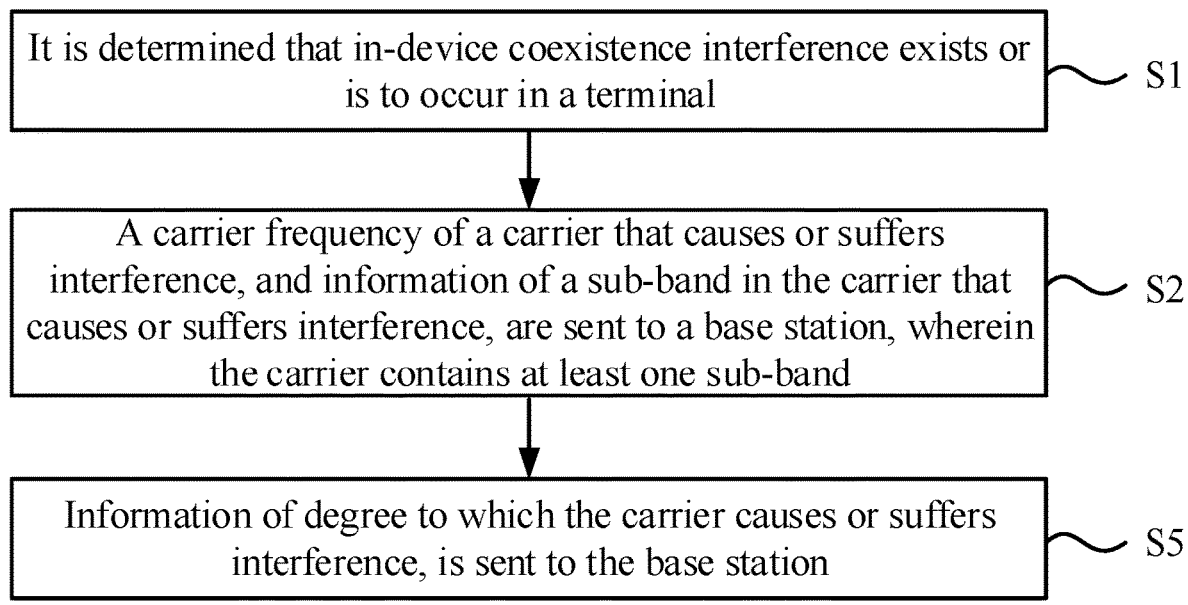
FIG. 5 is a schematic flowchart showing another method for indicating in-device coexistence interference according to an embodiment of the present disclosure.

FIG. 5 is a schematic flowchart showing another method for indicating in-device coexistence interference according to an embodiment of the present disclosure. As shown in FIG. 5, the method further includes:

In step S6, information of degree to which the carrier causes or suffers interference, is sent to the base station.

In one embodiment, the terminal may further send the information of degree to which the carrier causes or suffers interference, to the base station, so that the base station can determine specific conditions under that the carrier causes or suffers interference, so as to accurately make an response, to ensure solving the in-device coexistence interference that exists or is to occur in the terminal. For example, if the carrier suffers interference to a greater degree, a transmitting and receiving power of the carrier can be increased by a greater magnitude, and if the carrier suffers interference to a smaller degree, the transmitting and receiving power of the carrier can be increased by a smaller magnitude.

In some examples, the information of degree includes at least one of the follows:

an identification of degree, and a decibel value.

In one embodiment, the information of degree to which the carrier causes or suffers interference, can be a specific decibel value (db value), such as causing 20 dB interference, suffering 50 dB interference, etc., or an identification of degree, wherein the terminal and the base station can pre-store an association relationship between the identification of degree and the specific decibel value. The terminal can determine the identification of degree corresponding to the decibel value that causes or suffers interference according to the association relationship, and then report the identification of degree to the base station. The base station can determine the decibel value corresponding to the identification of degree according to the association relationship, for example, the identification of degree "a" corresponds to 10 dB, the identification of degree "b" corresponds to 20 dB, and the identification of degree "c" corresponds to 30 dB, then, when the received identification of degree is "b", it can be determined that the identification of degree is "b" corresponds to 20 dB.

It should be noted that the association relationship between the identification of degree and the decibel value can be determined by the terminal itself, and then notified to the base station, or it can be configured by the base station to the terminal.

Figure 6:
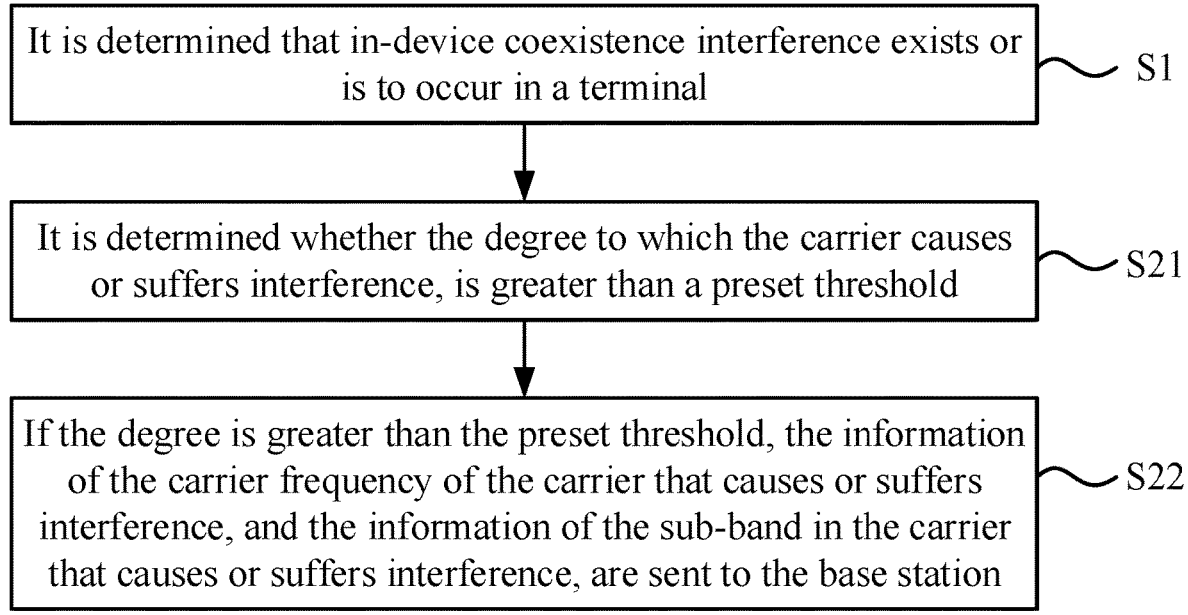
FIG. 6 is a schematic flowchart showing another method for indicating in-device coexistence interference according to an embodiment of the present disclosure.

FIG. 6 is a schematic flowchart showing another method for indicating in-device coexistence interference according to an embodiment of the present disclosure. As shown in FIG. 6, sending the information of the carrier frequency of the carrier that causes or suffers interference, and the information of the sub-band in the carrier that causes or suffers interference, to the base station, includes:

In step S21, it is determined whether the degree to which the carrier causes or suffers interference, is greater than a preset threshold.

In step S22, in response to the degree being greater than the preset threshold, the information of the carrier frequency of the carrier that causes or suffers interference, and the information of the sub-band in the carrier that causes or suffers interference, are sent to the base station.

In an embodiment, in some cases, the terminal does not have high requirements for communication quality, so, when the degree to which the carrier in the network used by the terminal causes or suffers interference, is low, but the communication requirements of the terminal can still be met, in this case, there is no need for the base station to solve the in-device coexistence interference. In this embodiment, it can be determined whether the degree to which the carrier causes or suffers interference, is greater than a preset threshold, and when the degree is greater than the preset threshold, that is, the in-device coexistence interference cannot meet the communication requirements of the terminal, then the information of the carrier frequency of the carrier that causes or suffers interference, and the information of the sub-band in the carrier that causes or suffers interference, to the base station. When the degree is less than or equal to the preset threshold, since the communication requirements of the terminal can still be met, there is no need to send the information of the carrier frequency of the carrier that causes or suffers interference, and the information of the sub-band in the carrier that causes or suffers interference, to the base station, so as to reduce the communication load between the terminal and the base station.

Corresponding to the foregoing embodiments of method for indicating in-device coexistence interference, the present disclosure further provides embodiments of device for indicating in-device coexistence interference.

Figure 7:
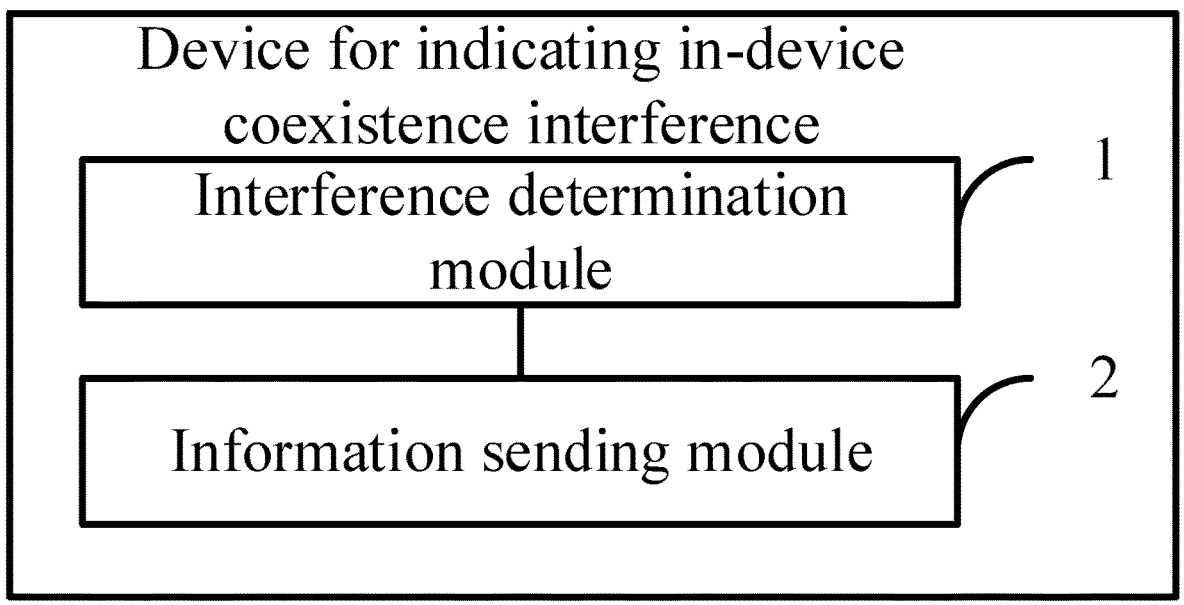
FIG. 7 is a schematic block diagram of a device for indicating in-device coexistence interference according to an embodiment of the present disclosure.

FIG. 7 is a schematic block diagram of a device for indicating in-device coexistence interference according to an embodiment of the present disclosure. The device for indicating in-device coexistence interference shown in this embodiment can be applied to terminals such as mobile phones, tablet computers, and wearable devices. The terminal can be used as a user equipment to communicate with a base station, wherein it can communicate with the base station based on 5G NR.

As shown in FIG. 7, the device for indicating in-device coexistence interference may include:

an interference determination module 1, configured to determine that in-device coexistence interference exists or is to occur in a terminal; and an information sending module 2, configured to send a carrier frequency of a carrier that causes or suffers interference, and information of a sub-band in the carrier that causes or suffers interference, to a base station, wherein the carrier contains at least one sub-band.

In some examples, the information of the sub-band includes:

a frequency offset of a frequency point of the sub-band with respect to the carrier frequency, and a bandwidth of the sub-band.

Figure 8:
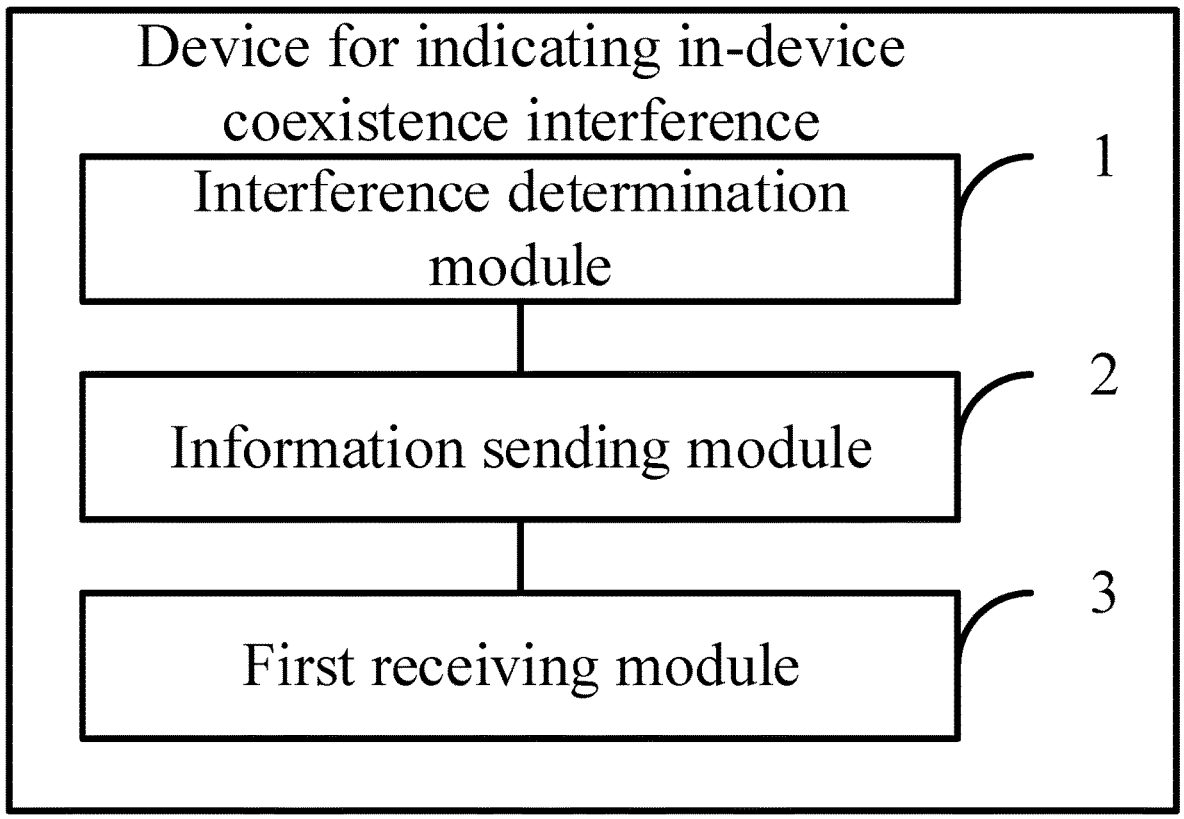
FIG. 8 is a schematic block diagram showing another device for indicating in-device coexistence interference according to an embodiment of the present disclosure.

FIG. 8 is a schematic block diagram showing another device for indicating in-device coexistence interference according to an embodiment of the present disclosure. As shown in FIG. 8, the device further includes:

a first receiving module 3, configured to receive first configuration information sent by the base station;

wherein the first configuration information is configured to indicate at least one of the frequency offset, a number of the sub-bands, and the bandwidth of the sub-band, and other items are predetermined.

In some examples, the information of the sub-band includes:

the frequency point of the sub-band, and the bandwidth of the sub-band.

Figure 9:
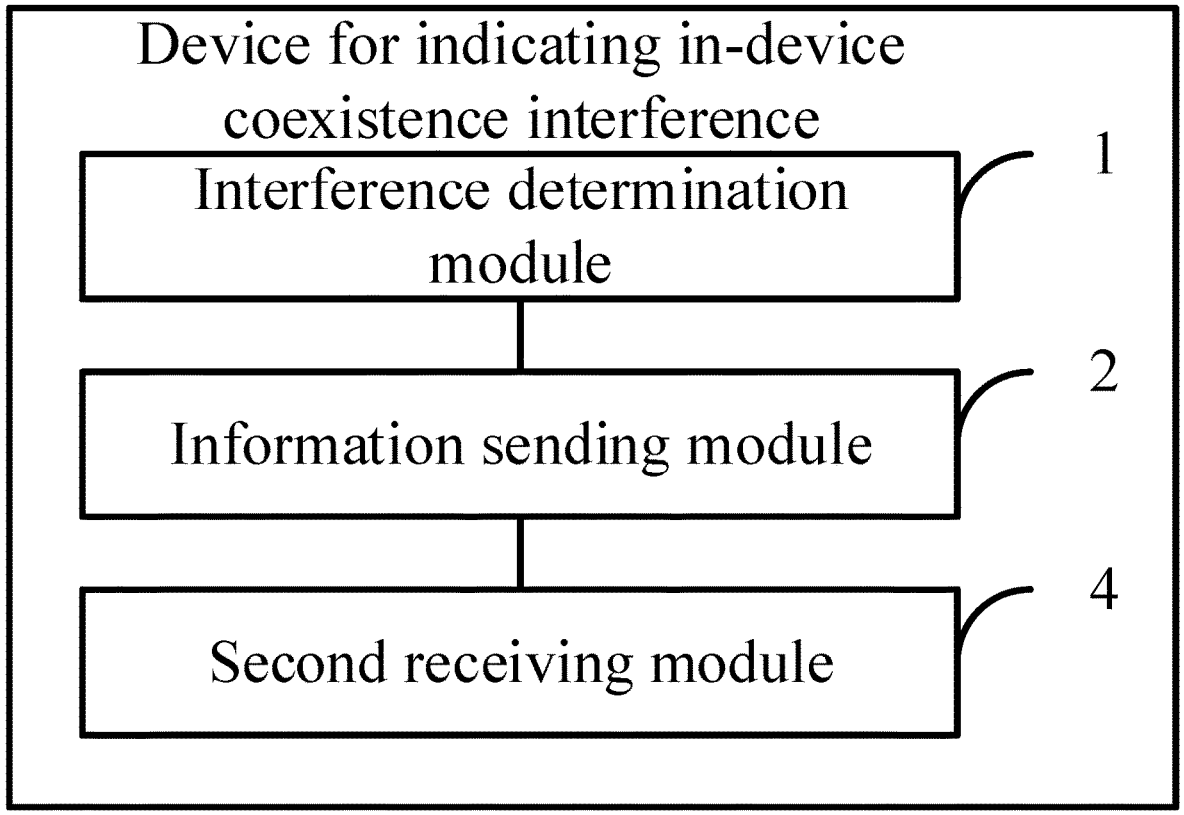
FIG. 9 is a schematic block diagram showing another device for indicating in-device coexistence interference according to an embodiment of the present disclosure.

FIG. 9 is a schematic block diagram showing another device for indicating in-device coexistence interference according to an embodiment of the present disclosure. As shown in FIG. 9, the device further includes:

a second receiving module 4, configured to receive second configuration information sent by the base station;

wherein the second configuration information is configured to indicate at least one of the number of the sub-bands, and the bandwidth of the sub-band, and other items are predetermined.

In some examples, the carrier contains a plurality of sub-bands, and the information of the sub-band includes:

identification information associated with the sub-band.

In some examples, the sub-band is a bandwidth part.

In some examples, the information sending module 2 is further configured to send information of an interference direction of the carrier to the base station.

In some examples, the terminal communicates based on a combination of a plurality of carriers, and in response to the combination of the plurality of carriers suffering or causing interference, the information of the sub-band includes:

combination information of sub-bands in the plurality of carriers that suffer or cause interference.

In some examples, the information sending module 2 is further configured to send information of degree to which the carrier causes or suffers interference, to the base station.

In some examples, the information of degree includes at least one of the follows:

an identification of degree, and a decibel value.

Figure 10:
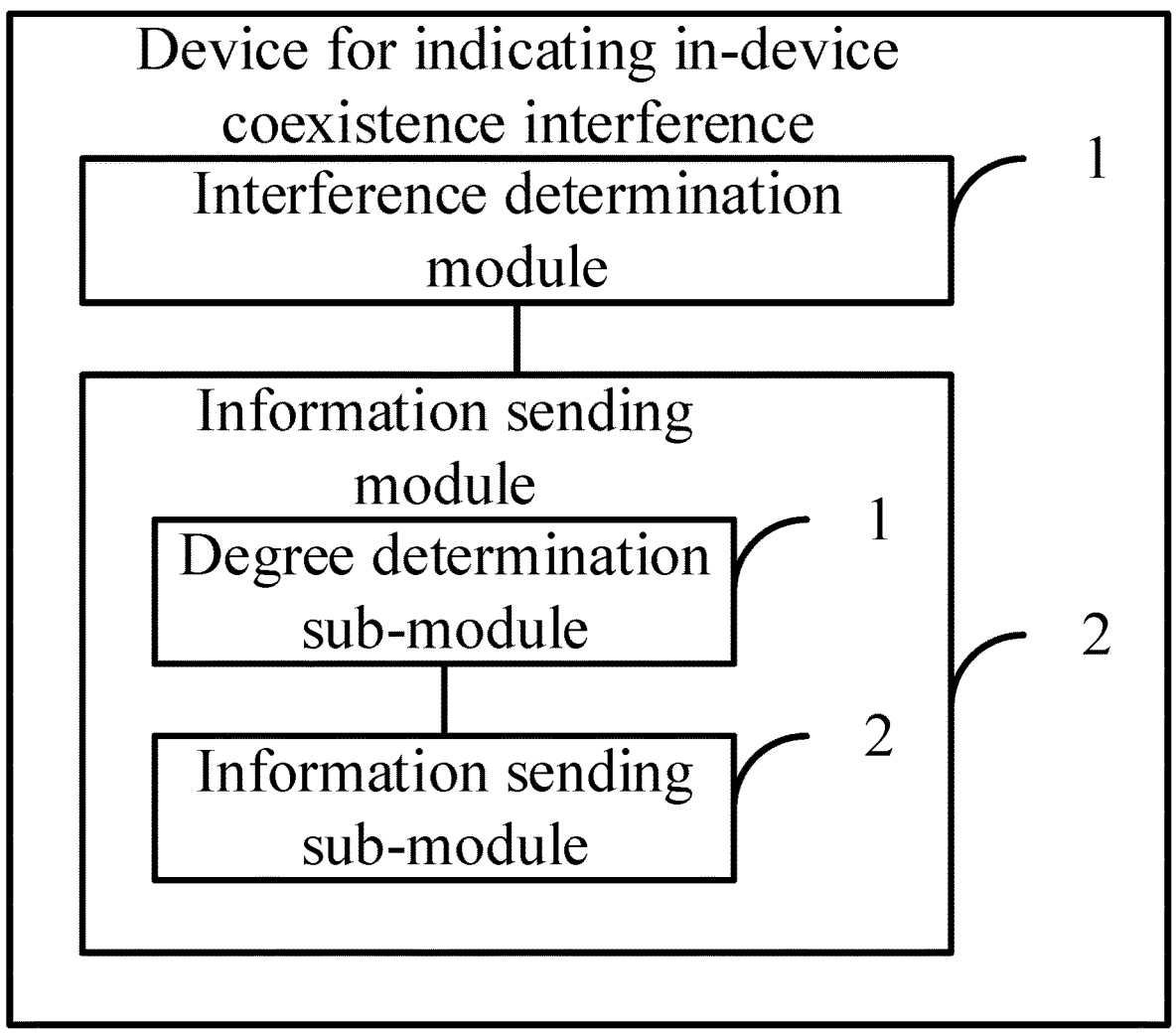
FIG. 10 is a schematic block diagram showing another device for indicating in-device coexistence interference according to an embodiment of the present disclosure.

FIG. 10 is a schematic block diagram showing another device for indicating in-device coexistence interference according to an embodiment of the present disclosure. As shown in FIG. 10, the information sending module 2 includes:

a degree determination sub-module 21, configured to determine whether the degree to which the carrier causes or suffers interference, is greater than a preset threshold; and an information sending sub-module 22, configured, in response to the degree being greater than the preset threshold, to send the carrier frequency of the carrier that causes or suffers interference, and the information of the sub-band in the carrier that causes or suffers interference, to the base station.

Regarding the device in the foregoing embodiments, the specific manner in which each module performs the operation has been described in detail in the embodiments of the related method, and will not be elaborated here.

As for the device embodiments, since they basically correspond to the method embodiments, the relevant part can be refer to the part of the description of the method embodiments. The device embodiments described above are merely illustrative, wherein the modules described as separate components may or may not be physically separated, and the component displayed as a module may or may not be a physical module, that is, it may be located in one place, or it can be distributed to a plurality of network modules. A part or all of the modules can be selected according to actual needs to achieve the objects of the solutions of the embodiments, and those of ordinary skill in the art can understand and implement without creative work.

The present disclosure further provides an electronic device, including:

processor; and a memory for storing processor-executable instructions;

wherein the processor is configured to realize the methods for indicating in-device coexistence interference described in any of the foregoing embodiments.

The present disclosure further provides a computer-readable storage medium, on which a computer program is stored, and when the program is executed by a processor, the steps in the methods for indicating in-device coexistence interference described in any of the foregoing embodiments are realized.

Figure 11:
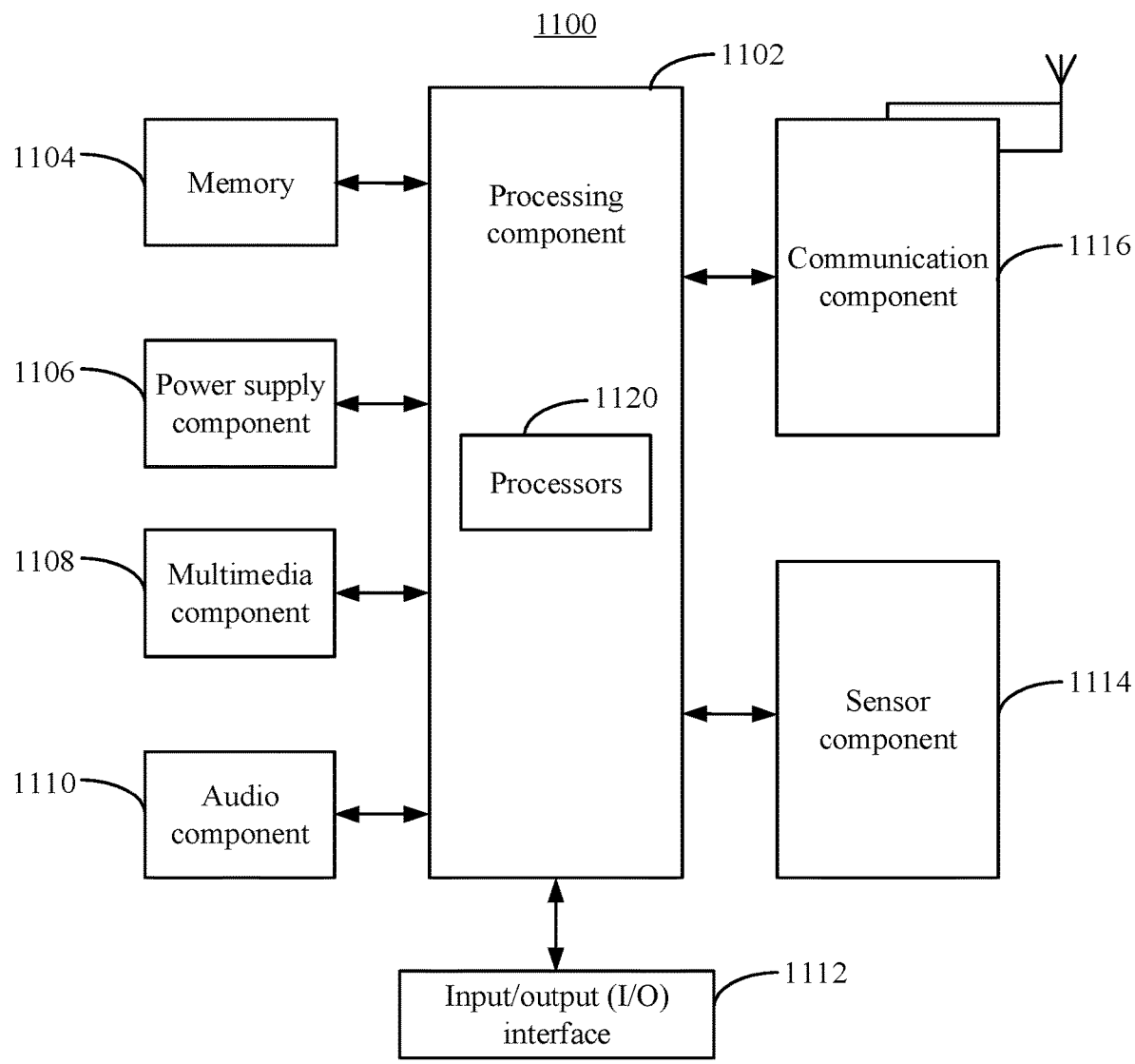
FIG. 11 is a schematic block diagram of an apparatus 1100 for indicating in-device coexistence interference according to an embodiment of the present disclosure.

FIG. 11 is a schematic block diagram showing an apparatus 1100 for indicating in-device coexistence interference according to an embodiment of the present disclosure. For example, the apparatus 1100 may be a mobile phone, a computer, a digital broadcasting terminal, a messaging device, a game console, a tablet device, a medical device, a fitness device, a personal digital assistant, etc.

Referring to FIG. 11, the apparatus 1100 may include one or more of the following components: a processing component 1102, a memory 1104, a power supply component 1106, a multimedia component 1108, an audio component 1110, an input/output (I/O) interface 1112, a sensor component 1114, and a communication component 1116.

The processing component 1102 generally controls the overall operations of the apparatus 1100, such as operations associated with display, telephone calls, data communications, camera operations, and recording operations. The processing component 1102 may include one or more processors 1120 to execute instructions, to complete all or a part of the steps of the foregoing method. In addition, the processing component 1102 may include one or more modules, to facilitate the interaction between the processing component 1102 and other components. For example, the processing component 1102 may include a multimedia module, to facilitate the interaction between the multimedia component 1108 and the processing component 1102.

The memory 1104 is configured to store various types of data, to support operations on the apparatus 1100. Examples of these data include: instructions for any application or method operating on the apparatus 1100, contact data, phone book data, messages, pictures, videos, etc. The memory 1104 can be realized by any type of volatile or non-volatile storage device or their combination, such as static random access memory (SRAM), electrically erasable programmable read-only memory (EEPROM), erasable and Programmable read-only memory (EPROM), programmable read-only memory (PROM), read-only memory (ROM), magnetic memory, flash memory, magnetic disk or optical disk.

The power supply component 1106 provides power for various components of the apparatus 1100. The power supply component 1106 may include a power management system, one or more power supplies, and other components associated with the generation, management, and distribution of power for the apparatus 1100.

The multimedia component 1108 includes a screen that provides an output interface between the apparatus 1100 and the user. In some embodiments, the screen may include a liquid crystal display (LCD) and a touch panel (TP). If the screen includes a touch panel, the screen may be realized as a touch screen, to receive input signals from the user. The touch panel includes one or more touch sensors, to sense touch, sliding, and gestures on the touch panel. The touch sensor may not only sense the boundary of a touch or slide action, but also detect the duration and pressure related to the touch or slide operation. In some embodiments, the multimedia component 1108 includes a front camera and/or a rear camera. When the apparatus 1100 is in an operation mode, such as a shooting mode or a video mode, the front camera and/or the rear camera can receive external multimedia data. Each front camera and rear camera can be a fixed optical lens system, or have focal length and optical zoom capability.

The audio component 1110 is configured to output and/or input audio signals. For example, the audio component 1110 includes a microphone (MIC), and when the apparatus 1100 is in an operation mode, such as a call mode, a recording mode, and a voice recognition mode, the microphone is configured to receive external audio signals. The received audio signal may be further stored in the memory 1104 or sent via the communication component 1116. In some embodiments, the audio component 1110 further includes a speaker for outputting audio signals.

The I/O interface 1112 provides an interface between the processing component 1102 and a peripheral interface module. The above-mentioned peripheral interface module may be a keyboard, a click wheel, a button, and the like. These buttons may include but are not limited to: home button, volume button, start button, and lock button.

The sensor component 1114 includes one or more sensors for providing various aspects of state evaluation for the apparatus 1100. For example, the sensor component 1114 can detect the on/off state of the apparatus 1100, and the relative positioning of components. For example, the component is the display and the keypad of the apparatus 1100. The sensor component 1114 can further detect the position change of the apparatus 1100 or a component of the apparatus 1100, the presence or absence of contact between the user and the apparatus 1100, the orientation or acceleration/deceleration of the apparatus 1100, and the temperature change of the apparatus 1100. The sensor component 1114 may include a proximity sensor configured to detect the presence of nearby objects without physical contact. The sensor component 1114 may further include a light sensor, such as a CMOS or CCD image sensor, for use in imaging applications. In some embodiments, the sensor component 1114 may further include an acceleration sensor, a gyroscope sensor, a magnetic sensor, a pressure sensor or a temperature sensor.

The communication component 1116 is configured to facilitate wired or wireless communication between the apparatus 1100 and other devices. The apparatus 1100 can access a wireless network based on a communication standard, such as WiFi, 2G or 3G, 4G LTE, 5G NR, or a combination thereof. In an exemplary embodiment, the communication component 1116 receives a broadcast signal or broadcast related information from an external broadcast management system via a broadcast channel. In an exemplary embodiment, the communication component 1116 further includes a near field communication (NFC) module, to facilitate short-range communication. For example, the NFC module can be realized based on radio frequency identification (RFID) technology, infrared data association (IrDA) technology, ultra-wideband (UWB) technology, Bluetooth (BT) technology and other technologies.

In an exemplary embodiment, the apparatus 1100 may be realized by one or more application specific integrated circuits (ASIC), digital signal processors (DSP), digital signal processing devices (DSPD), programmable logic devices (PLD), field programmable gate array (FPGA), a controller, a microcontroller, a microprocessor, or other electronic components, to implement the method described in any of the foregoing embodiments.

In an exemplary embodiment, there is further provided a non-transitory computer-readable storage medium including instructions, such as a memory 1104 including instructions, and the foregoing instructions may be executed by the processor 1120 of the apparatus 1100, to complete the foregoing method. For example, the non-transitory computer-readable storage medium may be ROM, random access memory (RAM), CD-ROM, magnetic tape, floppy disk, optical data storage device, etc.

According to the embodiments of the present disclosure, in the case that the terminal has or is to have in-device coexistence interference, it can send the carrier frequency of the carrier that causes or suffers interference, to the base station, so that the base station can determine the carrier that causes or suffers interference according to the carrier frequency. In addition, it can send information of sub-band in the carrier that causes or suffers interference, to the base station, so that the base station can determine the specific sub-band in the carrier that causes or suffers interference according to the information of the sub-band. Therefore, when the terminal is based on network communication with a larger bandwidth and has or is to have in-device coexistence interference, the base station can accurately determine which sub-band in the carrier used for terminal communication causes or suffers interference according to the carrier frequency and the information of the sub-band reported by the terminal, so that the base station can accurately determine how to resolve the in-device coexistence interference that exists or is to occur in the terminal.

After considering the specification and practicing the disclosure disclosed herein, those skilled in the art will easily think of other embodiments of the present disclosure. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims.

It should be noted that, in this article, relational terms such as first and second are only configured to distinguish one entity or operation from another entity or operation, and do not necessarily require or imply any such actual relationship or order between these entities or operations. The terms "include", "contain" or any other variants thereof are intended to cover non-exclusive inclusion, so that a process, method, article or device including a series of elements not only includes those elements, but also includes other elements that are not explicitly listed, or further includes elements inherent to such processes, methods, articles, or equipment. If there are no more restrictions, the element defined by the sentence "including a . . . " does not exclude the existence of other identical elements in the process, method, article, or equipment that includes the element.

The methods and devices provided by the embodiments of the present disclosure are described in detail above, and specific examples are used in this article to illustrate the principles and implementations of the present disclosure. The descriptions of the above embodiments are only used to help understand the methods of the present disclosure and their core ideas; at the same time, for those of ordinary skill in the art, according to the ideas of the present disclosure, there will be changes in the specific implementation and scope of application. In summary, the content of this specification should not be construed as a limitation on the present disclosure.

What is claimed is:

1. A method for indicating in-device coexistence interference, comprising:
    communicating, by a terminal, a combination of a plurality of carriers with a base station;
    determining, by the terminal, that in-device coexistence interference exists or is to occur in the terminal; and
    determining, by the terminal, interference information, wherein the interference information comprises a frequency point of a sub-band in a 5G network that causes or suffers interference, a bandwidth of the sub-band in the 5G network that causes or suffers interference, and combination information of sub-bands that cause or suffer interference in the plurality of carriers.

2. The method according to claim 1, further comprising: receiving second configuration information sent by the base station,
    wherein the second configuration information is configured to indicate at least one of following parameters: a number of the sub-bands or the bandwidth of the sub-band.

3. The method according to claim 1, wherein the interference information comprises:
    identification information associated with the sub-band, and the sub-band is a bandwidth part.

4. The method according to claim 1, further comprising: sending information of an interference direction of the sub-band to the base station.

5. The method according to claim 1, further comprising:
    sending information of degree to which the sub-band causes or suffers interference, to the base station, and the information of degree comprises at least one of following parameters:
    an identification of degree or a decibel value.

6. The method according to claim 1, further comprising: the interference information to the base station.

7. A device for indicating in-device coexistence interference, comprising:
    a processor; and
    a memory for storing processor-executable instructions, wherein the processor is configured to:
    communicate a combination of a plurality of carriers with a base station;
    determine that in-device coexistence interference exists or is to occur in a terminal; and
    determine interference information, wherein the interference information comprises a frequency point of a sub-band in a 5G network that causes or suffers interference, a bandwidth of the sub-band in the 5G network that causes or suffers interference, and combination information of sub-bands that cause or suffer interference in the plurality of carriers.

8. The device according to claim 7, wherein the processor is further configured to:
    receive second configuration information sent by the base station,
    wherein the second configuration information is configured to indicate at least one of following parameters: a number of the sub-bands, or the bandwidth of the sub-band.

9. The device according to claim 7, wherein the interference information comprises:
    identification information associated with the sub-band, and the sub-band is a bandwidth part.

10. The device according to claim 7, wherein the processor is further configured to send information of an interference direction of the sub-band to the base station.

11. The device according to claim 7, wherein the processor is further configured to send information of degree to which the sub-band causes or suffers interference, to the base station, and the information of degree comprises at least one of following parameters:
    an identification of degree, or a decibel value.

12. The device according to claim 7, wherein the processor is further configured to:
    the interference information to the base station.

* * * * *